Feb. 10, 1942.  H. M. CROSBY  2,272,768

FREQUENCY MODULATION MEASUREMENT

Filed June 21, 1940

Inventor:
Howard M. Crosby,
by Harry E. Dunham
His Attorney.

Patented Feb. 10, 1942

2,272,768

UNITED STATES PATENT OFFICE 2,272,768

FREQUENCY MODULATION MEASUREMENT

Howard M. Crosby, Schenectady, N. Y., assignor to General Electric Company, a corporation of New York Application June 21, 1940, Serial No. 341,719

21 Claims. (Cl. 179—171.5)

My invention relates to a method and apparatus for measuring frequency modulated waves.

As is well known, frequency modulation is a term applied to modulation effected by varying the frequency of high frequency carrier waves at a rate and in a degree determined respectively by the frequency and amplitude of modulating waves. The amplitude of the carrier waves is preferably maintained constant, as distinguished from amplitude modulation wherein the frequency of the high frequency carrier waves remains constant and the amplitude thereof is varied in accordance with the modulating waves.

In amplitude modulated radio systems the degree of modulation of a modulated carrier wave is commonly measured by means of an oscilloscope or oscillograph having a pair of coordinate deflecting elements to which the modulated carrier waves and modulating waves are respectively applied, thereby causing a projected ray to be deflected in a particular manner. The pattern traced by the ray on a viewing screen or other sensitive surface is determined by the amplitudes of these waves and gives a direct indication of the degree of modulation, as is well understood in the art. However, this method of measurement is unsuitable for the direct measurement of modulation in a frequency modulation system since the amplitude of the modulated waves is not a function of the modulating potentials.

It is accordingly an object of my invention to provide an improved method and means for measuring the frequency characteristics of frequency modulated waves.

It is another object of my invention to provide a method and means for analyzing and indicating directly the degree of modulation of frequency modulated waves.

A further object of my invention is to provide a method and apparatus for producing a wave pattern in accordance with frequency modulated waves and altering the configuration of said pattern in accordance with waves of a known frequency to give a direct indication of the degree of modulation.

Still another object of my invention is to provide a method and apparatus utilizing a cathode ray oscilloscope or oscillograph to give a direct indication of the degree of modulation of frequency modulated waves and for calibrating the same to measure modulation indirectly.

Figure 1:
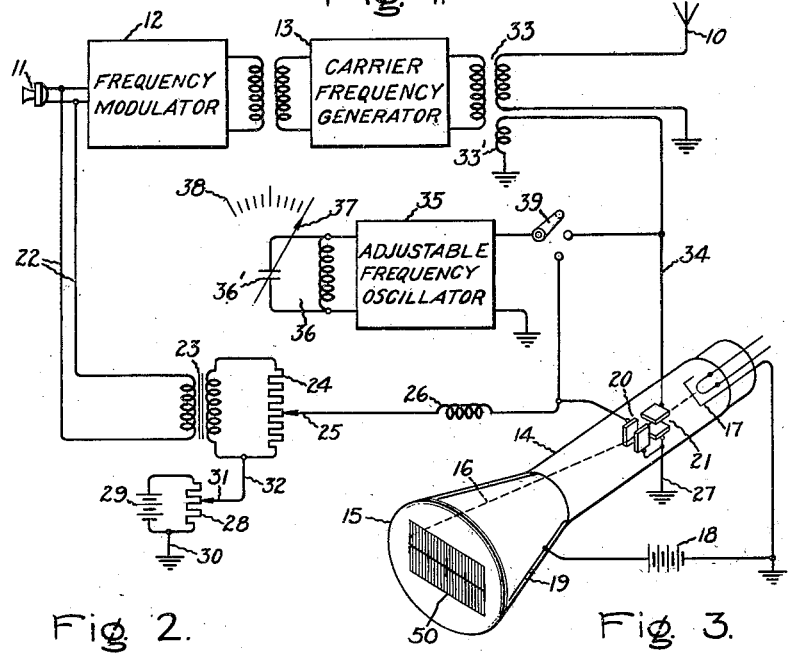
Figure 2:
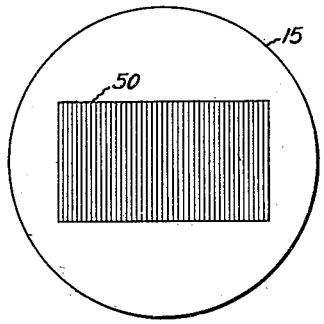
Figure 3:
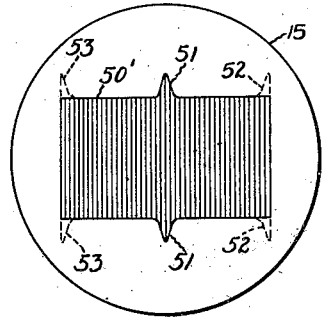

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 diagrammatically illustrates, partly in conventionalized block form, a frequency modulation transmission system incorporating modulation measuring means embodying my invention; Figs. 2 and 3 represent oscillograms explanatory of the operation of the system of Fig. 1, and Figs. 4 through 6 illustrate various calibration scales which may be employed with the apparatus of Fig. 1.

Referring now to Fig. 1, my invention is illustrated in apparatus for monitoring a frequency modulation transmitter. The transmitter may comprise any suitable apparatus known to the art for supplying an antenna 10 with high frequency energy, the frequency of which is varied in accordance with a source of modulation potentials, for example, a microphone 11. The details of the transmitter form no part of my invention and are therefore not represented. Briefly, modulating potentials supplied from the source 11 are applied to the frequency modulator 12. By means of the modulator 12 the frequency of the oscillations generated by the carrier frequency generator 13 is varied over a frequency band at a rate and in a degree determined respectively by the frequency and amplitude of the potentials supplied from the modulation source 11. The transmitting apparatus may of course include the usual elements for maintaining the amplitude of the modulated waves constant and for amplifying them prior to transmission.

While the modulation source 11 has been illustrated diagrammatically as a microphone 11 it will of course be understood that it may comprise any suitable source. For example, it may be replaced by an audio frequency oscillator generating a tone for test purposes.

The measuring apparatus includes a suitable device for giving an indication of the characteristics of the waves supplied to the antenna 10. This is illustrated as an oscilloscope 14 of the cathode ray type, since this type is particularly suited for use in a practical apparatus embodying my invention. This device is of the usual construction, comprising an evacuated envelope having a fluorescent screen 15 at one end against which a stream of electrons forming a ray 16 is projected from a cathode 17, illustrated conventionally as of the indirectly heated type. The potential from a source 18, impressed between an anode 19 and the cathode 17 serves to accelerate the ray 16 toward the screen 15. The device is also provided with the usual ray deflecting means, illustrated as the pairs of electro-static deflection plates 20 and 21, to which control potentials may be applied. One or both of the ray deflecting means may, of course, be of the magnetic type rather than the electrostatic type, if desired. The device may also include other elements such as means for focusing the ray and controlling the intensity thereof which are not shown since they are non-essential to an understanding of my invention.

While the device 14 has been indicated as a cathode ray oscilloscope, it will be apparent that it may comprise an oscillograph for producing a permanent record. The electro-optical type of instrument may also be used, where the frequency of the waves under investigation permits, in which a light ray rather than an electron ray is utilized to trace a two-dimensional pattern in accordance with the control potentials.

Potentials derived from the modulation source 11 and the transmitter output to the antenna 10 are applied respectively to the horizontal and vertical deflecting plates 20 and 21. As illustrated, waves generated by the source 11 are impressed through conductors 22 upon the primary of the transformer 23. The transformer secondary winding is connected to the extremities of a potentiometer 24. An adjustable tap 25 thereon is connected through a high frequency choke 26 to one of the deflecting plates 20, the other plate 20 being connected to ground through conductor 27. An additional potentiometer 28 connected across a source of constant bias potential, illustrated as a battery 29, is provided for maintaining a controllable amount of direct current bias on the plates 20 for purposes that will be apparent shortly. One terminal of potentiometer 28 and source 29 is grounded through conductor 30, and the adjustable tap 31 is connected to the lower end of potentiometer 24 through conductor 32 as shown. Thus, the complete circuit including the plates 20 extends from ground through conductor 30, an adjustable portion of bias potentiometer 28, tap 31, conductor 32, an adjustable portion of the potentiometer 24 across which potentials derived from modulation source 11 are developed, tap 25, choke 26, plates 20 and through conductor 27 to ground.

The means for deriving potentials from the transmitter output is illustrated as a tertiary winding 33' on the output transformer 33 which couples the transmitter to the antenna 10. One end of winding 33' is grounded and the other end is connected to one of the vertical deflecting plates 21 through the conductor 34. The complete circuit including the plates 21 extends from ground, through winding 33', conductor 34, plates 21, and conductor 27 to ground. If desired, a potentiometer or other suitable means, not shown, may be provided for adjusting the magnitude of the potentials applied to plates 21 from winding 33'.

In accordance with my invention and for reasons to be described presently, an adjustable frequency oscillator 35 is provided. This oscillator may be of any well-known construction and is therefore indicated only diagrammatically. It is designed to generate oscillations of a predetermined known frequency which can be adjusted to any selected value within a band of frequencies. For reasons that will be set forth below this band is made wide enough to include the band of high frequencies which may be present in the frequency modulated transmitter output to antenna 10. Thus the oscillator 35 is indicated conventionally as having its frequency controlled by the variable capacitor 36' included in the frequency determining circuit 36. The movable element of capacitor 36' may carry a suitable pointer 37 movable over a scale 38 calibrated in terms of the oscillator frequency.

The oscillator output may be applied to a selected pair of the deflection plates 20 or 21 through the three-position switch 39. With the switch 39 in the upper position, as shown, the oscillator 35 is disconnected entirely from the plates. With the switch in the midposition, the output of oscillator 35 is applied to the vertical deflecting plates 21 concurrently with the potentials supplied from the winding 33'. When the switch 39 is in the lower position the output is applied to the horizontal deflecting plates 20 concurrently with the potentials derived from the source 11. The high frequency choke 26 serves to prevent the high frequency oscillations from oscillator 35 from finding a low impedance path to ground through potentiometers 24 and 28 when switch 39 is in the lower position.

Considering now the operation of the apparatus just described, assume first that the switch 39 is in the upper position and that oscillations are being supplied to the antenna 10, these oscillations being frequency modulated in acordance with the modulating potentials supplied by the source 11. A pattern 50 is produced on the screen 15 of the cathode ray oscilloscope of the general configuration as best indicated in Fig. 2. It is seen that this pattern is substantially rectangular. The height thereof depends on the amplitude of the frequency modulated waves applied to the vertical deflecting plates 21. The width depends upon the amplitude of the potentials applied to the horizontal deflecting plates 20 from the modulation source 11. The height of the pattern is therefore substantially constant and independent of the degree of modulation, while the width thereof varies directly with the degree of modulation. Since the instantaneous frequency of the output wave is a function of the instantaneous amplitude of the modulating potentials, each point along the horizontal axis of the pattern represents a definite instantaneous frequency of the output wave.

Assuming that the apparatus is in operation as just described to produce the pattern shown in Fig. 2, if the switch 39 is now moved to the mid position, so that a potential is now applied to the vertical deflecting plates 21 from the oscillator 35, the pattern is changed to one similar to that indicated at 50' in Fig. 3. It is seen that the shape of the pattern is still essentially rectangular except for a pair of diametrically opposite peaks 51. As the frequency of oscillator 35 is varied, it has been found that both these peaks move horizontally along the upper and lower edges of the pattern, always remaining vertically aligned.

The explanation of this phenomenon is thought to be as follows. If the horizontal sweep potentials derived from the source 11 are applied to the plates 20 and if the oscillator 35 alone is connected to the vertical plates 21, a rectangular pattern similar to that of Fig. 2 is produced. However, the waves at all points along the horizontal axis of this pattern are of the same predetermined frequency of oscillator 35. It will be recalled from the previous discussion of Fig. 2 that each point on the horizontal axis of the rectangular pattern produced by the frequency modulated waves corresponds to a different instantaneous frequency. If these two patterns are now combined, by the simultaneous application of oscillations from winding 33' and oscillator 35 upon the deflecting plates 21 and oscillations from modulation source 11 upon plates 20, the pattern of Fig. 3 results. It has been found that the vertical height of the pattern, excluding the peaks 51, is substantially determined by the oscillations of greater amplitude applied to the vertical deflecting plates 21. Preferably, though not necessarily, the oscillations supplied by oscillator 35 are of much less amplitude than those supplied by the winding 33'. Thus, apparently the pattern produced by the oscillations of greater amplitude effectively masks the pattern due to those of lesser amplitude over most of the resultant pattern. However, at one particular point on the horizontal axis the instantaneous frequency of the oscillations supplied from the winding 33' will be exactly equal to the frequency of the oscillations supplied from the oscillator 35. Waves of the same frequency may add vectorially, and the magnitude of their resultant depends on the phase angle between them. The value of this phase angle is a matter of fortuitous occurrence in this system and probably shifts rapidly since the two waves are independently generated. At some instants of time the two waves will combine additively to produce a resultant greater than either one, producing the peaks 51 in the pattern. Due to the persistence of vision and the retentivity of the fluorescent screen 15, these peaks appear to exist continuously.

While logically it might be supposed that the pattern shown in Fig. 3 would be produced only when switch 39 is in the mid position, as a matter of fact it has been observed that it also results when switch 39 is in the lower position, connecting oscillator 35 to the horizontal deflecting plates 20. Although I am not able to explain this effect with certainty, it is believed that electrostatic coupling between the two pairs of deflecting plates 20 and 21 in the cathode ray discharge device 14 is responsible. Apparently, due to the structure and characteristics of this particular type of device, enough energy of the frequency of oscillator 35 is coupled to the vertical deflecting plates 21 under these conditions to produce the effect described.

While I have suggested theories which seem to me to provide reasonable explanations for the occurrence of these phenomena, of course their correctness or incorrectness is immaterial to the practice of my invention. It has been found from actual experiments that these well-defined peaks do occur under the conditions specified.

Since, as previously mentioned, the position of the peaks 51 is indicative of the point at which the instantaneous frequency of the frequency modulated waves equals that of the oscillator 35, a very convenient means for direct frequency measurement is provided. If the frequency of oscillator 35 is adjusted to the mean carrier frequency of the waves supplied to antenna 10 and if the frequency modulation is symmetrical about this mean carrier frequency, the peaks 51 occur exactly at the center of the pattern as shown in Fig. 3. As the frequency of oscillator 35 is increased the peaks move in a horizontal direction, for example to the right on the pattern. When they reach the dotted positions 52 at the edge of the band the frequency of oscillator 35 corresponds to the upper limit of the frequency swing of the modulated carrier waves and may be read directly from the calibrated scale 38. Similarly, as the frequency of oscillator 35 is decreased until the peaks occupy the dotted positions 53, the lower edge of the modulation band is determined. Reversing the connections to the plates 20 of course reverses the pattern.

Figure 4:
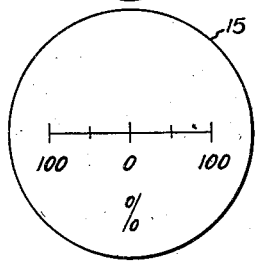
Figure 5:
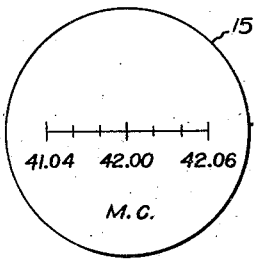
Figure 6:
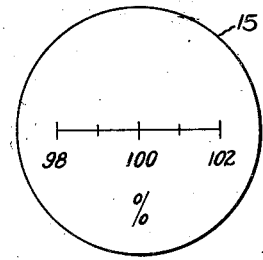

Once the apparatus is adjusted for a given set of operating conditions, a scale placed on the screen 15 may be calibrated by means of the oscillator 35 for indirect measurements of frequency modulation. Figs. 4, 5 and 6 illustrate various scales which may be employed. In Fig. 4, for example, the scale is calibrated in terms of per cent modulation above and below the mean carrier frequency. 100 per cent modulation is arbitrarily defined as a certain definite frequency deviation above or below the mean frequency. In Fig. 5 a scale is shown calibrated directly in terms of frequency. As illustrated, the scale is designed for transmission apparatus for which the assigned mean frequency is 42.00 megacycles. If the maximum allowable frequency swing is 60 kilocycles above or below this frequency, the upper and lower ends of the scale will correspond to 42.06 and 41.04 megacycles respectively.

By increasing or decreasing the constant potential bias applied to the horizontal deflecting plates 20 from the potentiometer 28, the entire pattern may be shifted to one side so that only one edge is visible on the screen, and by increasing the magnitude of the modulation potentials applied to these plates from the potentiometer 24, the visible portion of the pattern may be expanded horizontally. By thus shifting and expanding the horizontal scale the position of the edge of the pattern may be measured with much greater accuracy, either directly or indirectly. Thus, for example, Fig. 6 illustrates a scale calibrated in terms of per cent modulation near the upper limit of frequency swing. From this it is a simple matter to determine whether the maximum modulation swing is being maintained within allowable limits.

Oscillations supplied from several oscillators of known frequency may be impressed simultaneously on the deflecting electrodes to give a plurality of peaks each corresponding to the frequency of one of the oscillators. Thus, for example, an oscillator of highly constant frequency may be maintained accurately at the mean carrier frequency, as by crystal or resonant line control. This will produce an accurately located peak corresponding to the frequency of the unmodulated carrier. Other oscillators may be adjusted for the upper and lower limits of the maximum permissible modulation band. Thus, the symmetry or dissymmetry of modulation will be readily apparent and a horizontal shift of the entire pattern will indicate a deviation of the mean carrier frequency from its assigned value.

While I have shown my invention employed for monitoring a frequency modulation transmitter, it will be apparent that it can equally well be employed with a frequency modulation receiver. In such case additional amplification of the received signals may be necessary to provide sufficient voltage for operating the indicating or recording device.

Although I have shown a particular system for carrying out the principles of my invention, it will of course be understood that I do not wish to be limited thereto since many modifications may be made therein, and I contemplate by the appended claims to cover any such modifications which fall within the true spirit and scope of my invention.

What I claim as new and desire to secure by Letters Patent of the United States is:

1. The method of analyzing electrical oscillations whose frequency is varied over a frequency band at a rate and in a degree determined respectively by the frequency and amplitude of modulating oscillations which comprises the steps of producing an instantaneous two-dimensional pattern, one dimension of which is determined by the oscillations to be analyzed, and the other dimension of which is determined by the modulating oscillations, independently producing oscillations of a predetermined frequency lying within said band and altering the configuration of said pattern in accordance with said last-named oscillations.

2. The method of analyzing electrical oscillations whose frequency is varied at a rate and in a degree determined respectively by the frequency and amplitude of modulating oscillations which comprises the steps of producing an instantaneous electrical pattern in rectangular coordinates, the abscissae of which are proportional to the amplitude of said modulating oscillations and the ordinates of which are proportional to the amplitude of said oscillations to be analyzed, independently producing oscillations of a predetermined known frequency within the range of frequencies of the oscillations to be analyzed, and altering the shape of said pattern in accordance with said predetermined frequency to give an indication of the degree of frequency variations in said oscillations to be analyzed.

3. The method of analyzing oscillations which are frequency modulated over a frequency band in accordance with modulating potentials comprising the steps of producing a two-dimensional pattern whose dimensions are determined by the oscillations to be analyzed and the modulating potentials respectively, independently producing oscillations of a predetermined frequency within said band and altering the configuration of said pattern in accordance with said last-named oscillations.

4. The method of analyzing the frequency characteristics of electrical waves whose frequency is varied over a band of frequencies as a function of modulating potentials comprising the steps of directing an electron beam against a sensitive surface, deflecting said beam in one direction in accordance with said waves to be analyzed, deflecting said beam in another direction in accordance with said modulating potentials and concurrently deflecting said beam in said first direction in accordance with oscillations of a predetermined known frequency lying within said band, whereby said beam traverses a pattern on said surface whose configuration is a function of said characteristics.

5. The method of analyzing the frequency characteristics of electrical waves whose amplitude is substantially constant and whose frequency is varied over a band of frequencies as a function of modulating potentials comprising the steps of projecting an electron beam against a sensitive screen, deflecting said beam along a first axis in accordance with said waves to be analyzed, deflecting said beam along a second, mutually perpendicular axis in accordance with said modulating potentials, whereby said beam is caused to traverse said screen in a pattern of substantially rectangular outline and whereby each point on said pattern along said second axis corresponds to a definite instantaneous frequency of said waves to be analyzed, and calibrating the positions of said points upon said screen in terms of the corresponding instantaneous frequencies, thereby to determine said frequency variations.

6. The method of analyzing the frequency characteristics of frequency modulated electrical oscillations whose instantaneous frequency is a function of the instantaneous magnitude of modulating oscillations which comprises the steps of projecting an energy-bearing ray against a screen, said ray being effective to produce an indication thereon, deflecting said ray along a first axis in response to said modulated oscillations, deflecting said ray along a second axis in response to said modulating oscillations, whereby said ray is caused to trace a two-dimensional pattern on said screen and whereby each point on said pattern along said second axis corresponds to a definite instantaneous frequency of said modulated oscillations, and calibrating the positions of said points upon said screen in terms of the corresponding instantaneous frequencies, thereby to determine said frequency characteristics.

7. The method of analyzing the frequency characteristics of frequency modulated electrical oscillations whose instantaneous frequency is a function of the instantaneous magnitude of modulating oscillations which comprises the steps of generating other oscillations of a predetermined frequency within the range of frequencies over which said frequency modulated oscillations are varied, projecting an energy-bearing ray against a surface, said ray being effective to produce an indication thereon, deflecting said ray along an axis in accordance with said modulating oscillations, and conjointly and simultaneously deflecting said ray along a mutually perpendicular axis in accordance with said frequency modulated oscillations and said oscillations of predetermined frequency, whereby said ray is caused to traverse said surface in a pattern whose shape is a function of said characteristics.

8. The method of determining the frequency characteristics of frequency modulated high frequency waves whose instantaneous frequency is a function of the instantaneous amplitude of lower frequency modulating waves comprising the steps of independently generating waves of a known frequency which may be adjusted to any frequency within the range of frequencies included by said frequency modulated waves, developing and projecting a stream of electrons against a surface, deflecting said stream in one direction in response to said modulating waves and conjointly and simultaneously deflecting said stream in another mutually perpendicular direction in response both to said frequency modulated waves and to said known frequency waves, whereby said stream is caused to traverse said surface in a pattern whose shape is a function of said frequency characteristics.

9. The method of determining the degree of modulation of frequency modulated high frequency waves which extend over a continuous frequency band and whose instantaneous frequency is a function of the instantaneous amplitude of modulating waves comprising the steps of producing waves of a predetermined high frequency lying within said band, developing and projecting a stream of electrons against a surface, deflecting said stream in one direction in response to said modulating waves, simultaneously deflecting said stream in another mutually perpendicular direction in response to said frequency modulated waves, whereby a pattern of substantially rectangular outline is traversed by said stream upon said surface whose width in said first direction is proportional to the width of said band, and conjointly and simultaneously further deflecting said stream in said last named direction in response to said predetermined frequency waves, whereby diametrically opposite deformations are produced in opposite sides of said pattern whose positions correspond to the position of said predetermined frequency within said band.

10. The combination, in apparatus for measuring frequency modulated waves whose instantaneous frequency is a function of the instantaneous magnitude of modulating waves, of a source of waves of known frequency, means to develop and project an energy-bearing ray against a surface, said ray being effective to produce an indication on said surface, a pair of ray deflecting means each adapted to be energized to deflect said ray in one of two different directions, means to energize one of said deflecting means in response to said frequency modulated waves, means to energize the other of said deflecting means in response to said modulating waves, and means to energize one of said deflecting means in response to said known frequency waves.

11. Apparatus for analyzing frequency modulated electrical oscillations whose frequency is varied over a band of frequencies in accordance with modulating potentials comprising, in combination, a source of oscillations of a predetermined known frequency lying within said band, means to project an energy-bearing ray against a surface, said ray being effective to produce an indication on said surface, means to deflect said ray along an axis in response to said oscillations to be analyzed, means to deflect said ray along a second axis in response to said modulating potentials, and means conjointly to deflect said ray along said first axis in response to said oscillations of known frequency.

12. Apparatus for analyzing frequency modulated electrical oscillations whose amplitude is substantially constant and whose frequency is varied over a band of frequencies as a function of modulating potentials comprising, in combination, means to project an electron beam against a sensitive screen, means to deflect said beam along a first axis in response to said oscillations to be analyzed, means to deflect said beam along a second mutually perpendicular axis in response to said modulating potentials, whereby said beam is caused to traverse said screen in a pattern of substantially rectangular outline and whereby each point on said pattern along said second axis corresponds to a definite instantaneous frequency of said waves to be analyzed, and a scale positioned adjacent said screen and calibrated to indicate the positions of said points upon said screen in terms of the corresponding instantaneous frequencies.

13. Apparatus for analyzing the frequency characteristics of frequency modulated electrical oscillations whose instantaneous frequency is a function of the instantaneous magnitude of modulating oscillations comprising, in combination, means to project an energy-bearing ray against a screen, said ray being effective to produce an indication on said surface, means to deflect said ray along a first axis in response to said modulated oscillations, means to deflect said ray along a second axis in response to said modulating oscillations, whereby said ray is caused to trace a two-dimensional pattern on said screen and whereby each point on said pattern along said second axis corresponds to a definite instantaneous frequency of said modulated oscillations, and a scale positioned adjacent said screen and calibrated to indicate the positions of said points upon said screen in terms of the corresponding instantaneous frequencies.

14. The combination, in apparatus for analyzing frequency modulated wave energy whose instantaneous frequency is a function of the instantaneous magnitude of modulating potentials, of an adjustable source of waves of known frequency, a cathode ray discharge device including a sensitive screen, means to develop a cathode ray therein and to direct it toward said screen and a pair of coordinate ray deflecting means, means to impress said waves to be analyzed on one of said deflecting means, means simultaneously to impress said modulating potentials on said other deflecting means, means conjointly to impress said known frequency waves on one of said deflecting means, and means to adjust the frequency of said known frequency waves.

15. The combination, with a source of modulation frequency waves, a high frequency source of waves of substantially constant amplitude and means for modulating the frequency of said high frequency waves over a frequency band in a degree determined by the instantaneous amplitude of said modulation frequency waves, of an adjustable source of waves of a known frequency lying within said band, a cathode ray discharge device having ray developing means and a pair of coordinate ray deflecting means, means to energize one of said ray deflecting means with said modulation frequency waves, means to energize the other of said ray deflecting means with said frequency modulated high frequency waves, whereby said ray is caused to traverse a pattern of substantially rectangular outline representative of said frequency band, and means conjointly to energize one of said ray deflecting means with said known frequency waves whereby said pattern is locally deformed to give an indication of the position of said known frequency within said band.

16. The combination, with a source of modulation frequency waves, a high frequency source of waves of substantially constant amplitude and means for modulating the frequency of said high frequency waves over a frequency band in a degree determined by the instantaneous amplitude of said modulation frequency waves, of an adjustable source of waves of a known frequency lying within said band, a cathode ray discharge device having ray developing means and a pair of coordinate ray deflecting means, means to energize one of said ray deflecting means with said modulation frequency waves, means to energize the other of said ray deflecting means with said frequency modulated high frequency waves, whereby said ray is caused to traverse a pattern of substantially rectangular outline representative of said frequency band, means conjointly to energize one of said ray deflecting means with said known frequency waves whereby said pattern is locally deformed to give an indication of the position of said known frequency within said band, and means to vary said known frequency over said band to measure the width thereof.

17. A modulation indicator comprising a source of a modulation signal, a source of a carrier signal having its frequency modulated in accordance with said modulation signal, means for modifying the amplitude of said carrier signal at least at one of its modulation frequencies, a cathode-ray tube having a luminescent screen adapted to be scanned by a beam of electrons, means for deflecting said beam in one direction in accordance with said modified frequency-modulated carrier signal, and means for deflecting said beam in another direction in accordance with said modulation signal to produce a pattern on said screen indicative of the frequency excursions of said frequency-modulated carrier signal.

18. A modulation indicator comprising a source of a modulating signal, a source of a carrier signal having its frequency modulated in accordance with said modulation signal, means for modifying the amplitude of said carrier signal at certain frequencies, a cathode-ray tube having a luminescent screen adapted to be scanned by a beam of electrons, means for deflecting said beam in one direction in accordance with said modified frequency-modulated carrier signal, means for deflecting said beam in another direction in accordance with said modulation signal to produce a pattern on said screen indicative of the frequency excursions of said frequency-modulated carrier signal, and indicating means positioned adjacent said pattern calibrated to indicate the carrier-frequency excursion as a function of the amplitude of said modulation signal.

19. The method of analyzing the frequency characteristics of electrical waves whose frequency is varied over a band of frequencies as a function of modulating potentials comprising the steps of directing an electron beam against a sensitive surface, deflecting said beam in one direction in accordance with said waves to be analyzed, deflecting said beam in another direction in accordance with said modulating potentials and modifying the deflection of said beam in said first direction at least at one predetermined known frequency lying within said band, whereby said beam traverses a pattern on said surface whose configuration is a function of said characteristics.

20. A modulation indicator comprising a source of a modulation signal, a source of a carrier signal having its frequency modulated in accordance with said modulation signal, a cathode-ray tube having a luminescent screen adapted to be scanned by a beam of electrons, means for deflecting said beam in one direction in accordance with said modulation signal, means for deflecting said beam in another direction in accordance with said frequency-modulated carrier signal, and means for modifying the amplitude of deflection of said beam in said second direction at least at one of the frequencies over which said carrier signal is modulated, whereby a pattern is produced on said screen indicative of the frequency excursions of said frequency-modulated carrier signal.

21. A modulation indicator comprising a source of a modulation signal, a source of a carrier signal having its frequency modulated in accordance with said modulation signal, a cathode-ray tube having a luminescent screen adapted to be scanned by a beam of electrons, means for deflecting said beam in one direction in accordance with said modulation signal, means for deflecting said beam in another direction in accordance with said frequency-modulated carrier signal, means for modifying the amplitude of deflection of said beam in said second direction at least at one of the frequencies over which said carrier signal is modulated, whereby a pattern is produced on said screen indicative of the frequency excursions of said frequency-modulated carrier signal, and indicating means positioned adjacent said pattern calibrated to indicate the carrier-frequency excursion as a function of the amplitude of said modulation signal.

HOWARD M. CROSBY.